United States Patent Office 3,686,190
Patented Aug. 22, 1972

3,686,190
2-PYRIDINETHIOACETAMIDES
Charles Malen, Fresnes, Bernard Danree, St.-Germain-en-Laye, and Xavier Poscaud, Paris, France, assignors to Societe en nom collectif Science Union et Cie, Societe Francaise de Recherche Medicale, Suresnes, France
No Drawing. Original application July 2, 1969, Ser. No. 838,696. Divided and this application Aug. 7, 1970, Ser. No. 62,202
Int. Cl. C07d 31/50
U.S. Cl. 260—294.8 E                 9 Claims

ABSTRACT OF THE DISCLOSURE

Ethane thioamides disubstituted in 2-position by Het and R, Het being 2 - pyridyl, 2- and 4-pyrimidyl, 2-pyrazinyl, 2- and 4- thiazolyl, which are optionally substituted, and R being lower-alkyl having up to six carbon atoms inclusive when Het is 2-pyridyl, and when Het is other than 2-pyridyl, R is then, lower-alkyl having up to six carbon atoms inclusive, hydrogen, phenyl, halophenyl, lower alkyl-phenyl or lower-alkyloxy phenyl.

These compounds possess antisecretory and ulceroprotector properties.

---

This is a division of application Ser. No. 838,696, filed July 2, 1969, now Pat. No. 3,624,085 dated Nov. 30, 1971.

The present invention provides thioamides of general Formula I

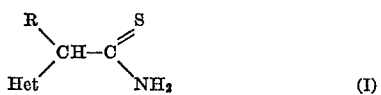

wherein

Het is a nitrogen-containing heterocyclic radical selected from the group consisting of 2-pyridyl, 2-pyrimidyl, 4-pyrimidyl, 2-pyrazinyl, 2-thiazolyl and 4-thiazolyl radicals which are unsubstituted or substituted by one or more substituents selected from the group consisting of halogen atoms and lower-alkyl and lower-alkoxy radicals having 1 to 5 carbon atoms inclusive;

R is a lower-alkyl radical having 1 to 6 carbon atoms inclusive, in the form of a linear or branched, saturated or unsaturated chain when Het is 2-pyridyl and, when Het is other than 2-pyridyl, R is selected from the group consisting of lower-alkyl having 1 to 6 carbon atoms inclusive, hydrogen, phenyl, mono- and poly-halophenyl, mono- and poly-lower-alkylphenyl, and mono- and poly-lower-alkyloxyphenyl radicals wherein the alkyl groups have 1 to 5 carbon atoms inclusive.

The present invention also provides physiologically tolerable addition salts of the derivatives of general Formula I, especially salts with strong acids.

Furthermore, all the compounds of general Formula I possess an asymmetric carbon atom and thus exist in the form of optical isomers. Thus the present invention also provides optical isomers of the compounds of Formula I and their physiologically tolerable acid addition salts.

The compounds of the present invention may be prepared by reacting a disubstituted acetonitrile of general Formula II

in which R and Het have the meanings given above, with hydrogen sulphide in an appropriate solvent.

The reaction is generally effected in a basic solvent, for example a mixture of pyridine-triethylamine, preferably at a temperature within the range of from 20 to 100° C.

The disubstituted acetonitriles of general Formula II are themselves prepared, from the corresponding monosubstituted acetonitriles, according to known methods such, for example, as method of C. D. Gutsche and H. W. Voges, J. Org. Chem. 32, No. 9, 2685-89 (1967), or by direct substitution of the corresponding monosubstituted acetonitriles, or by other appropriate known methods.

The derivatives of general Formula I of the present invention are new and possess valuable pharmacological and therapeutic properties. They especially exert an inhibitory effect on acid and peptic gastric secretions and afford protection against gastro-duodenal ulcers whilst being devoid of anticholinergic action.

These activities were demonstrated by the following tests:

(1) Ulcer of restrain (S. Bonfils et al.: Rev. Fr. Et. Clin. Biol. XI 343 (1966)). It was found that 50 to 100% of rats treated by 30 to 100 mg./kg. of the new products are protected against ulcer.

(2) Gastric secretion.

(A) Technique of Shay (H. Shay et al. Gastroent. 5, 43 (1945)).

The new products possess outstanding antisecretory properties, decreasing acid as well as pepsin secretion. Doses of 5 to 20 mg./kg. administered intraduodenally in the rat, inhibit 75 to 90% of the free hydrochloric acid and 40 to 60% of the pepsin output.

(B) Technique of Ghosh and Schild (Brit. J. Pharm. 13, 54 (1958)).

When administered at doses of 5 to 10 mg./kg. intravenously in the rat, the new compounds inhibit 15 to 70 of the increase of gastric acidity provided by the secretion-stimulant pentagastrine.

Moreover, it was demonstrated by the method of test-meal of A. F. Green (Brit. J. Pharm. 14, 27 (1959)) that the new compounds have no substantial effect on the gastrointestinal motricity.

Finally, the new derivatives have no action on the autonomic nervous system, nor on the central nervous system.

The toxicity of the compounds of the invention is very low and the $LD_{50}$ is situated between 500 and 2000 mg./kg. in mice by the oral route.

The above described pharmacological properties and the low toxicity enable the use of the new thioamides in therapy and especially in the treatment of gastroduodenal ulcers and gastric hypersecretion.

The present invention further provides pharmaceutical preparations comprising a compound of the general Formula I or one of its physiologicaly tolerable salts in admixture or conjunction with pharmaceutically suitable carriers for oral, rectal or parenteral administration.

Such suitable pharmaceutical carriers are, for example, distilled water, starch, talc, glucose, lactose, cocoa butter, etc. . . . in order to obtain suitable pharmaceutical forms such as, for example, tablets, dragees, capsules, suppositories or solutions.

The doses may vary from 50 to 500 mg., 1 to 5 times per day.

The following examples illustrate the invention. The melting points are determined on a Kofler block (BK) or on a Kofler heating bench under a microscope (MK).

EXAMPLE 1 dl-2-(2-pyridyl)-butane-thioamide

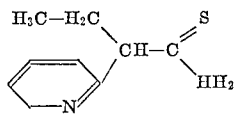

8 g. of 2-(2-pyridyl)-butane-nitrile, boiling point/0.1 mm. 60–65° C., prepared from 2-(2-pyridyl)-acetonitrile according to the method of C.D. Gutsche and H. W. Voges, J. Org. Chem. 32, No. 9, 2685–89 (1967), dissolved in 5.6 g. of triethylamine and 8 g. of anhydrous pyridine, were saturated with dry gaseous $H_2S$. The reaction mixture was heated to 100° C. in a sealed tube and kept at this temperature for 15 hours.

The mixture was subsequently diluted with water and then extracted with chloroform. The chloroform phase was washed with water and then dried. The chloroform was then evaporated and the solid residue recrystallised from benzene. 6 g. of dl-2-(2-pyridyl)-butane-thioamide, melting point (BK) 108–109° C., were obtained.

6 ml. of 4 N hydrogen chloride solution in ether were added to 4 g. of dl-2-(2-pyridyl)-butane-thioamide dissolved in 150 ml. of ethanol. The mixture was evaporated to dryness. The residue was recrystallized from a mixture of 50 ml. of ethyl acetate and 40 ml. of ethanol. 3.9 g. of dl-2-(2-pyridyl)-butane-thioamide hydrochloride were obtained; instantaneous melting point (BK) 180–181° C.

The following compounds were prepared according to the process described in Example 1, the starting materials either being known or being prepared from known materials according to methods known per se.

EXAMPLES 2–15

(2) dl-2-(2-pyridyl)-pentane-thioamide, melting point (BK) 93–94° C., instantaneous melting point (BK) of the hydrochloride 160–162° C., prepared by reaction of $H_2S$ with 2-(2-pyridyl)-pentane-nitrile, boiling point/0.1 mm. 68–70° C.

(3) dl-2-(2-pyridyl)-3-methyl-butane-thioamide, melting point (BK) 162–163° C., instantaneous melting point (BK) of the hydrochloride 198–200° C., prepared by reaction of $H_2S$ with 2-(2-pyridyl)-3-methyl-butane-nitrile, boiling point/0.01 mm. 48–52° C.

(4) dl-2-(2-pyridyl)-hexane-thioamide, melting point (BK) 104–105° C., instantaneous melting point (BK) of the hydrochloride 159–160° C., prepared by reaction of $H_2S$ with 2-(2-pyridyl)-hexane-nitrile, boiling point/ 0.04 mm. 76–80° C.

(5) dl - 2 - (2-pyridyl)-4-methyl-pentane-thioamide, melting point (BK) 138–140° C., prepared by reaction of $H_2S$ with 2-(2-pyridyl)-4-methyl-pentane-nitrile, boiling point/0.1 mm. 76–80° C.

(6) dl-2-(2-pyridyl)-octane-thioamide, melting point (BK) 75–76° C., prepared by reaction of $H_2S$ with 2-(2-pyridyl)-octane-nitrile, boiling point/0.04 mm. 97–100° C.

(7) dl - 2 - (2-pyridyl)-pent-4-ene-thioamide, melting point (BK) 74–75° C., instantaneous melting point (BK) of the hydrochloride 140–141° C., prepared by reaction of $H_2S$ with 2-(2-pyridyl)-pent-4-ene-nitrile, boiling point/0.3 mm. 72–74° C.

(8) dl - 2 - (2 - pyridyl)-propane-thioamide, instantaneous melting point (BK) of the hydrochloride 163–166° C., prepared by reaction of $H_2S$ with 2-(2-pyridyl)-propane-nitrile, boiling point/0.05 mm. 50–54° C.

(9) dl - 2 - (2-pyrimidyl)-2-phenyl-ethane-thioamide, melting point (BK) 185–186° C., prepared by reaction of $H_2S$ with 2-(2-pyrimidyl)-2-phenyl-ethane-nitrile, boiling point/0.03 mm. 132–140° C.

(10) dl - 2 - (2-pyrimidyl)-2-(4-chlorophenyl)-ethane-thioamide, melting point (MK) 150–154° C. with crystallisation around 148° C., prepared by reaction of $H_2S$ with 2 - (2 - pyrimidyl)-2-(4-chlorophenyl)-ethane-nitrile, boiling point/0.2 mm. 155–160° C.

(11) dl - 2 - (4,6-dimethyl-2-pyrimidyl)-ethane-thioamide, melting point (BK) 149–150° C., prepared by reaction of $H_2S$ with 2-(4,6-dimethyl-2-pyrimidyl)-ethane-nitrile, melting point (BK) 80–81° C.

(12) dl - 2 - (2-pyrazinyl)-2-phenyl-ethane-thioamide, melting point (BK) 142–143° C., prepared by reaction of $H_2S$ with 2-(2-pyrazinyl)-2-phenyl-ethane-nitrile, melting point (BK) 133–134° C.

(13) dl - 2 - (2-pyrazinyl)-ethane-thioamide, melting point (BK) 112–114° C., prepared by reaction of $H_2S$ with 2-(2-pyrazinyl)-ethane-nitrile, boiling point/18 mm. 145–150° C.

(14) dl - 2 - (2-pyrazinyl)-butane-thioamide, melting point (MK) 88–90° C., prepared by reaction of $H_2S$ with 2-(2-pyrazinyl)-butane-nitrile, boiling point/0.05 mm. 82–84° C.

(15) dl - 2 - (2-thiazolyl)-2-phenyl-ethane-thioamide, melting point (BK) 125–126° C., prepared by reaction of $H_2S$ with 2-(2-thiazolyl)-2-phenyl-ethane-nitrile, boiling point/0.01 mm. 115–125° C.

We claim:
1. A compound selected from the group consisting of (A) 2-(2-pyridyl) alkane thioamides of the general formula:

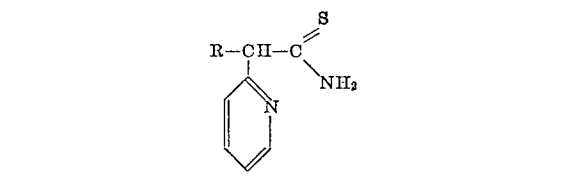

wherein R is lower-alkyl having 1 to 6 carbon atoms inclusive, in a linear or branched, saturated or unsaturated chain; and (B) physiologically acceptable addition salts thereof with suitable acids.

2. A compound of claim 1 which is dl-2-(2-pyridyl-butane-thioamide.

3. A compound of claim 1 which is dl-2-(2-pyridyl)-pentane-thioamide.

4. A compound of claim 1 which is dl-2-(2-pyridyl)-3-methyl-butane-thioamide.

5. A compound of claim 1 which is dl-2-(2-pyridyl)-hexane-thioamide.

6. A compound of claim 1 which is dl-2-(2-pyridyl)-4-methyl-pentane-thioamide.

7. A compound of claim 1 which is dl-2-(2-pyridyl)-octane thioamide.

8. A compound of claim 1 which is dl-2-(2-pyridyl)-pent-4-ene thioamide

9. A compound of claim 1 which is dl-2-(2-pyridyl)-propane-thioamide.

References Cited

Gardner et al.: J. Org. Chem. vol. 19, pp. 753–57 (1954).

ALAN L. ROTMAN, Primary Examiner

U.S. Cl. X.R.

260—250 R, 256.5 R, 306.8; 424—250, 251, 266, 270